US012724364B2

(12) United States Patent
Tanaka et al.

(10) Patent No.: US 12,724,364 B2
(45) Date of Patent: Sep. 1, 2026

(54) IMAGE FORMING APPARATUS AND METHOD OF CLEANING IMAGE FORMING APPARATUS

(71) Applicant: Konica Minolta, Inc., Tokyo (JP)

(72) Inventors: Hideaki Tanaka, Fussa (JP); Atsushi Nakamura, Saitama (JP); Shinichi Tsukamura, Uenohara (JP); Nobuyasu Tamura, Hachioji (JP); Ryo Fujimitsu, Tachikawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 19/208,870

(22) Filed: May 15, 2025

(65) Prior Publication Data

US 2025/0362630 A1 Nov. 27, 2025

(30) Foreign Application Priority Data

May 22, 2024 (JP) ................................ 2024-083067

(51) Int. Cl.
*G03G 15/20* (2006.01)
*G03G 15/00* (2006.01)

(52) U.S. Cl.
CPC ..... *G03G 15/2025* (2013.01); *G03G 15/2064* (2013.01); *G03G 15/5029* (2013.01)

(58) Field of Classification Search
CPC .......... G03G 15/2025; G03G 15/2064; G03G 15/5029
See application file for complete search history.

(56) References Cited

U.S. PATENT DOCUMENTS

2015/0220045 A1* 8/2015 Hatazaki ............ G03G 15/2025 399/327
2018/0284660 A1* 10/2018 Takematsu ......... G03G 15/2025
2020/0073314 A1* 3/2020 Tamaki .............. G03G 15/2025

FOREIGN PATENT DOCUMENTS

JP 2008-129138 A 6/2008

* cited by examiner

*Primary Examiner* — Sandra Brase

(74) *Attorney, Agent, or Firm* — LUCAS & MERCANTI, LLP

(57) ABSTRACT

Provided is an image forming apparatus including: a cleaning roller; a web feeder; and a hardware processor. The cleaning roller collects an adhering substance adhering to a fixer for fixing a toner image onto a recording medium. The web feeder feeds, to the cleaning roller, a web for collecting the adhering substance adhering to the cleaning roller. The hardware processor that controls operation of the web feeder. The hardware processor: calculates, based on job information of image formation, a required feed amount of the web required for collecting the adhering substance adhering to the cleaning roller; and, when the required feed amount is greater than a feed amount of the web that can be fed during execution of image formation of a job related to the job information, feeds the web to the cleaning roller after completion of the image formation.

14 Claims, 8 Drawing Sheets

| IMAGE AREA RATIO | NUMBER OF SHEETS ON WHICH IMAGES ARE FORMED | | |
|---|---|---|---|
| | LESS THAN 100 SHEETS | 100 SHEETS OR MORE AND LESS THAN 500 SHEETS | 500 SHEETS OR MORE |
| 40% OR MORE | MEDIUM SPEED | LOW SPEED | LOW SPEED |
| 10% OR MORE AND LESS THAN 40% | MEDIUM SPEED | MEDIUM SPEED | MEDIUM SPEED |
| 10% OR LESS | HIGH SPEED | HIGH SPEED | HIGH SPEED |

IMAGE FORMING APPARATUS AND METHOD OF CLEANING IMAGE FORMING APPARATUS

CROSS-REFERENCE TO RELATED APPLICATIONS

The entire disclosure of Japanese Patent Application No. 2024-083067 filed on May 22, 2024, is incorporated herein by reference in its entirety.

BACKGROUND OF THE INVENTION

Technical Field

The present invention relates to an image forming apparatus and a method of cleaning an image forming apparatus.

Description of Related Art

Some image forming apparatuses include a fixing roller for fixing a toner image onto a recording medium. Such an image forming apparatus includes a cleaning roller for cleaning the surface of the fixing roller. As a technology related to such an image forming apparatus, Japanese Unexamined Patent Publication No. 2008-129138 discloses that, during execution of a borderless printing mode, the timing of cleaning a cleaning member itself is determined based on image information corresponding to a toner image around an edge extending beyond the edge of a recording material. Furthermore, according to Japanese Unexamined Patent Publication No. 2008-129138, a cleaning roller cleaning mode is executed in a case where an integrated value of the amount of so-called edge toner adhering to the edge surface (side surface) of the recording material is a certain value or more after image formation on the recording material is completed.

Furthermore, in Japanese Unexamined Patent Publication No. 2008-129138, when a web for collecting toner from the surface of the cleaning roller is further provided, the winding amount of a web is determined in accordance with the amount of edge toner adhered during execution of the borderless printing mode. Thus, it is described that the web can be used to the end of durable life.

Incidentally, in the above-described image forming apparatus, even in a normal image forming mode which is not the borderless printing mode, the offset toner deposited on the fixing roller is collected on the side circumferential surface of the cleaning roller. Therefore, cleaning of the cleaning roller is required regardless of the image forming mode. The same applies to a configuration including a web for collecting toner from the surface of the cleaning roller.

It is therefore an object of the present invention to provide an image forming apparatus and a method of cleaning the image forming apparatus, which are capable of sufficiently collecting, by a web, an adhering substance collected from a fixing roller to a cleaning roller in an image forming job regardless of an image forming mode, thereby preventing occurrence of an image defect.

SUMMARY OF THE INVENTION

To achieve at least one of the abovementioned objects, according to an aspect of the present invention, an image forming apparatus reflecting one aspect of the present invention includes:

- a cleaning roller that collects an adhering substance adhering to a fixer for fixing a toner image onto a recording medium;
- a web feeder that feeds, to the cleaning roller, a web for collecting the adhering substance adhering to the cleaning roller; and
- a hardware processor that controls operation of the web feeder,
- wherein the hardware processor:
  - calculates, based on job information of image formation, a required feed amount of the web required for collecting the adhering substance adhering to the cleaning roller; and, when the required feed amount is greater than a feed amount of the web that can be fed during execution of image formation of a job related to the job information, feeds the web to the cleaning roller after completion of the image formation.

According to another aspect of the invention, a method of cleaning an image forming apparatus, the image forming apparatus includes:

- a cleaning roller that collects an adhering substance adhering to a fixer for fixing a toner image onto a recording medium; and
- a web feeder that feeds, to the cleaning roller, a web for collecting the adhering substance adhering to the cleaning roller,
- wherein a hardware processor that controls operation of the web feeder calculates, based on job information of image formation, a required feed amount of the web required for collecting the adhering substance adhering to the cleaning roller, and when the required feed amount is greater than a feed amount of the web that can be fed during execution of image formation of a job related to the job information, feeds the web to the cleaning roller after completion of the image formation.

BRIEF DESCRIPTION OF THE DRAWINGS

The advantages and features provided by one or more embodiments of the invention will become more fully understood from the detailed description given hereinafter and the appended drawings which are given by way of illustration only, and thus are not intended as a definition of the limits of the present invention, and wherein.

DETAILED DESCRIPTION

Hereinafter, one or more embodiments of the present invention will be described with reference to the drawings. However, the scope of the invention is not limited to the disclosed embodiments.

Embodiments of an image forming apparatus and a method of cleaning an image forming apparatus to which the present embodiment is applied will be described below in detail with reference to the drawings.

«Image Forming Apparatus»

Figure 1:
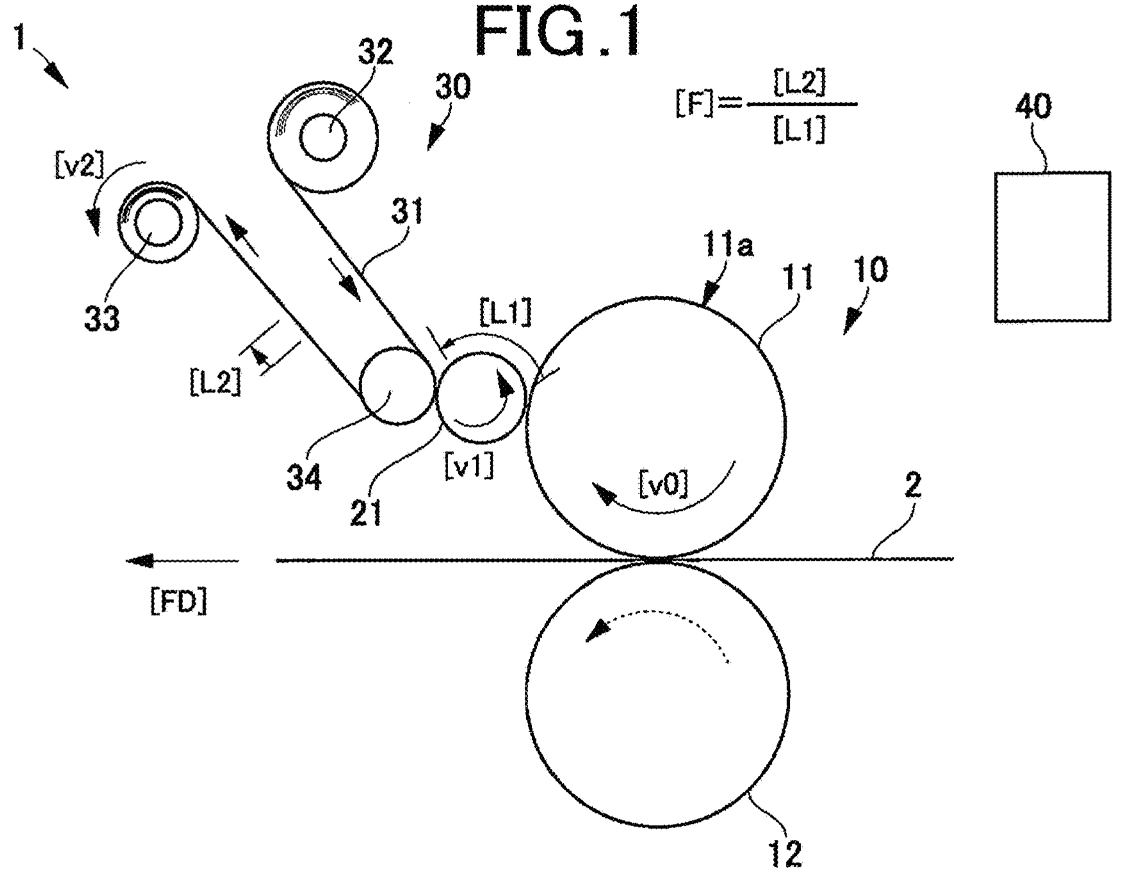
FIG. 1 is a configuration diagram (part 1) showing a main part of an image forming apparatus according to an embodiment.
Figure 2:
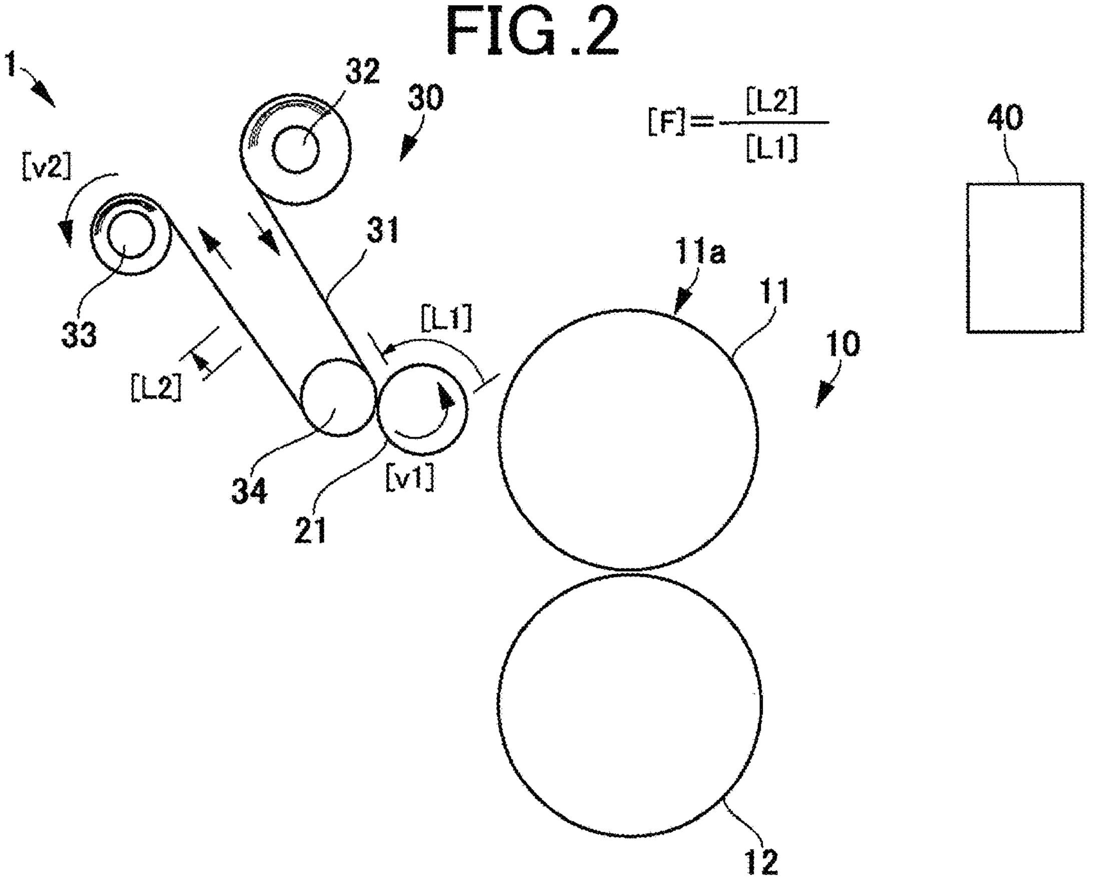
FIG. 2 is a configuration diagram (part 2) showing a main part of the image forming apparatus according to the embodiment.

FIGS. 1 and 2 are configuration diagrams (part 1) and (part 2) showing a main part of an image forming apparatus according to an embodiment. The image forming apparatus 1 shown in FIGS. 1 and 2 is of an electrophotographic method using toner. Such an image forming apparatus 1 includes a fixer 10, a cleaning roller 21, a web feeder 30, and a controller 40 (hardware processor), in addition to a medium feed section and an image forming section (not illustrated here). These are as follows.

<Fixer 10>

The fixer 10 is a unit for fixing the toner image transferred to a recording medium 2 onto the recording medium 2. The toner image is an image transferred onto the recording medium 2 by the image forming section (not illustrated here). The fixer 10 includes a fixing roller 11 and a pressure roller 12. The fixing roller 11 has a heater built in a cylindrical interior thereof, and a fixing surface 11*a* constituted by a cylindrical side circumferential surface is heated to a predetermined setting temperature by the heater. The fixing roller 11 has a drive motor, and rotates around a cylindrical shaft at a predetermined speed [v0]. On the other hand, the pressure roller 12 is disposed oppositely to the fixing roller 11 and presses the fixing surface 11*a* of the fixing roller 11 with a predetermined force.

The fixing roller 11 and the pressure roller 12 are disposed to sandwich the recording medium 2 conveyed from the image forming section (not illustrated herein). The recording medium 2 sandwiched between the fixing roller 11 and the pressure roller 12 is heated by contact with the fixing surface 11*a* of the fixing roller 11. The recording medium 2 is pressurized between the fixing roller 11 and the pressure roller 12 and conveyed in a predetermined conveyance direction [FD] according to the rotation of the fixing roller 11.

A fixing belt (not illustrated) may be held around the fixing roller 11. In this case, an opposing roller (not illustrated herein) is disposed parallel to the fixing roller 11, and an endless fixing belt is looped over the opposing roller and the fixing roller 11. Therefore, the recording medium 2 is sandwiched between the fixing roller 11 and the pressure roller 12 via the fixing belt. In such a configuration, the outer peripheral surface of the fixing belt serves as a fixing surface, and the configuration described below is similarly applied thereto. Therefore, hereinafter, a configuration in which the side circumferential surface of the fixing roller 11 serves as the fixing surface 11*a* will be described as an example.

<Cleaning Roller 21>

The cleaning roller 21 collects adherents such as offset toner and wax adhering to the fixing surface 11*a* of the fixing roller 11. The wax is an external additive contained in the toner, and re-adheres to the recording medium 2 from the fixing surface 11*a* of the fixing roller 11, thereby causing uneven gloss of the image. Therefore, the cleaning roller 21 collects the wax together with the offset toner from the fixing surface 11*a*.

The cleaning roller 21 is disposed parallel to the fixing roller 11, and can be in contact (the state of FIG. 1) to and separated (the state of FIG. 2) from the fixing surface 11*a* of the fixing roller 11 under the control of the controller 40. Furthermore, the rotation speed [v1] of the cleaning roller 21 is controllable under the control of the controller 40.

For example, when the offset toner and wax are collected from the fixing surface 11*a* of the fixing roller 11, as shown in FIG. 1, the cleaning roller 21 is abutted against the fixing surface 11*a*. In such a state, the image forming apparatus 1 is mainly in an image forming (printing) operation, and there is a possibility that the offset toner and wax adhere to the fixing surface 11*a* from the recording medium 2. During such an image forming operation, the rotation speed [v1] of the cleaning roller 21 is controlled such that the movement speed of the side circumferential surface of the cleaning roller 21 and the movement speed of the fixing surface 11*a* of the fixing roller 11 match each other.

On the other hand, when it is unnecessary to collect the offset toner and wax from the fixing surface 11*a* of the fixing roller 11, as shown in FIG. 2, the cleaning roller 21 is separated from the fixing surface 11*a*. In such a state, the image forming apparatus 1 is not in an image forming operation, and there is no possibility that the offset toner and wax from the recording medium 2 adhere to the fixing surface 11*a*. Further, in such a state, the rotation speed [v1] of the cleaning roller 21 is controllable regardless of the movement speed of the fixing surface 11*a* of the fixing roller 11.

<Web Feeder 30>

The web feeder 30 collects the offset toner and wax collected by the cleaning roller 21, and cleans the side circumferential surface of the cleaning roller 21. The web feeder 30 includes a web 31, an unwinding roller 32, a winding roller 33, and a press roller 34.

[Web 31]

The web 31 is a belt-like nonwoven fabric, and collects the offset toner and wax adhering to the side circumferential surface of the cleaning roller 21 from the side circumferential surface of the cleaning roller 21.

[Unwinding Roller 32]

The unwinding roller 32 has the web 31 wound therewith, and winds off the web 31.

[Winding Roller 33]

The winding roller 33 is a drive roller and wind up the web 31 wound around the unwinding roller 32. Under the control of the controller 40, the winding roller 33 can control the winding speed of the web 31, that is, the feeding speed [v2] of the web 31 relative to the cleaning roller 21. The movement direction of the web 31 with respect to the cleaning roller 21 may be opposite to the illustrated direction.

The press roller 34 is arranged in parallel with the cleaning roller 21, and presses the web 31, which is unwound from the unwinding roller 32 and wound up by the winding roller 33, against a side circumferential surface of the cleaning roller 21. The pressure roller 34 moves to follow contact/separation of the cleaning roller 21 with respect to the fixing roller 11.

<Controller 40>

The controller 40 is formed with a computing machine and controls the driving of the image forming apparatus 1. The computing machine is hardware used as a so-called computer, and includes a central processing unit (CPU), a read only memory (ROM), and a random access memory (RAM). Furthermore, the computing machine may include a nonvolatile storage and a network interface, and furthermore, an operation part and a display part as a user interface. The controller 40 comprehensively controls the operation of the components of the image forming apparatus 1 as the CPU reads a predetermined program from the ROM, develops the program in the RAM, and executes the developed program.

Figure 3:
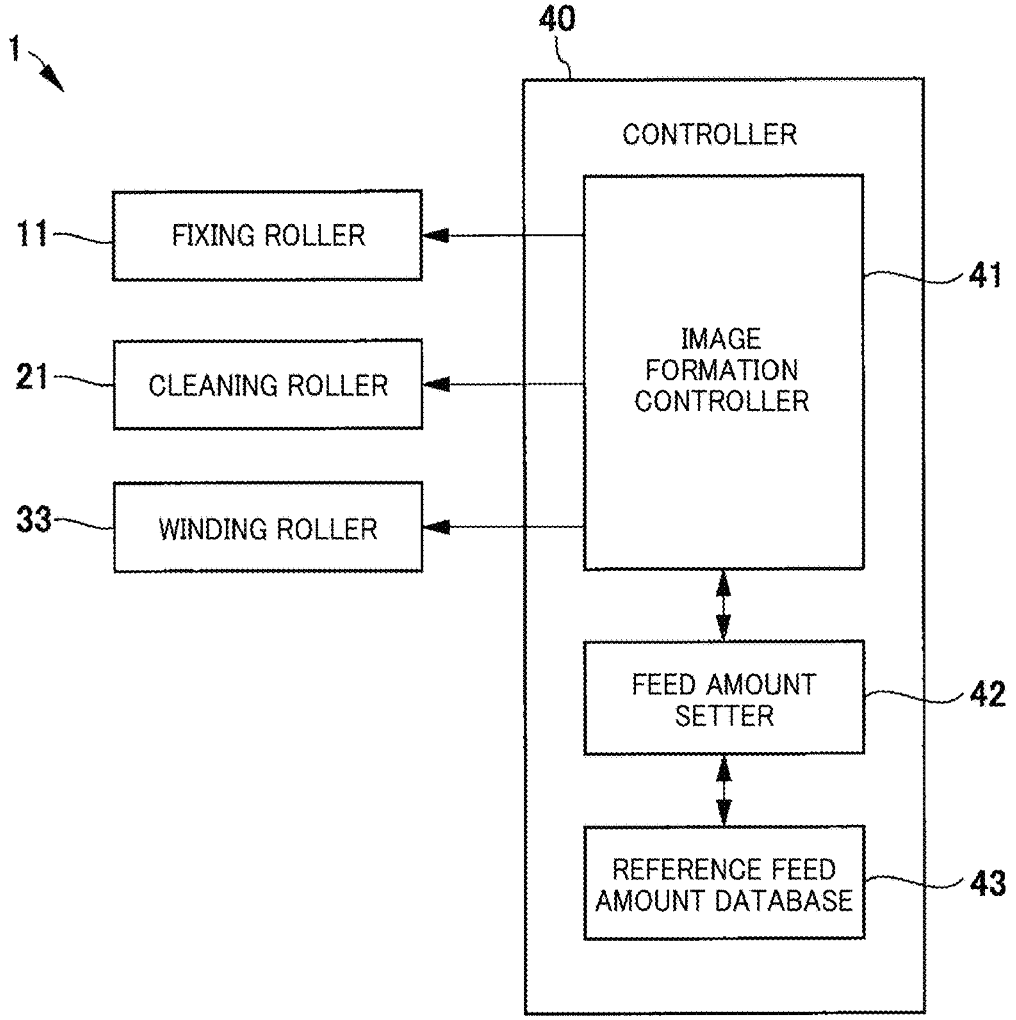
FIG. 3 is a block diagram of essential parts of the image forming apparatus according to the embodiment.

FIG. 3 shows a block diagram of essential parts of the image forming apparatus 1 according to the embodiment. As shown in FIG. 3, the controller 40 includes functional units: an image formation controller 41 (hardware processor); a feed amount setter 42; and a reference feed amount database 43. Hereinafter, these functional units will be described with reference to FIGS. 1 to 3.

[Image Formation Controller 41]

The image formation controller 41 controls the driving of the medium feed section and the image forming section (not illustrated here) and further controls the driving of the fixing roller 11, the cleaning roller 21, and the winding roller 33, to control execution of an image forming job by the image forming apparatus 1. The image forming job includes collection of the offset toner and wax from the fixing surface 11*a* of the fixing roller 11 by the cleaning roller 21. Furthermore, the image forming job includes collection of the offset toner and wax from the side circumferential surface of the cleaning roller 21 by the web 31.

In execution of such an image forming job, the image formation controller 41 controls contact/separation of the cleaning roller 21 with respect to the fixing surface 11*a* of the fixing roller 11, the rotation speed [v1] of the cleaning roller 21, and the feeding speed [v2] of the web 31.

The control of each part by the image formation controller 41 is executed based on information input from an external device or an operation part (not illustrated) of the image forming apparatus 1 and information from the feed amount setter 42. Details of the control by the image formation controller 41 will be described in the image forming method below.

[Feed Amount Setter 42]

The feed amount setter 42 sets a feed amount [F] of the web 31. Here, the feed amount [F] of the web 31 is a feed length of the web 31 with respect to the side circumferential surface of the cleaning roller 21. The feed amount [F] corresponds to the winding length [L2] of the web 31 by the winding roller 33 relative to the sliding length [L1] of the side circumferential surface of the cleaning roller 21. The feed amount setter 42 sets a feed amount [F] of the web 31 for cleaning the side circumferential surface of the cleaning roller 21 in execution of an image forming job.

The feed amount setter 42 sets the feed amount [F] of the web 31 based on the job information on the image forming job acquired from the image formation controller 41 and a reference feed amount [Fref] stored in the reference feed amount database 43 described next. The job information acquired by the feed amount setter 42 from the image formation controller 41 includes an image area ratio, a medium type, a toner type, a medium size (conveyance direction), and the number of sheets on which images are formed.

Based on these pieces of job information, the feed amount setter 42 extracts a corresponding reference feed amount [Fref] from reference feed amounts [Fref] stored in the reference feed amount database 43 to be described next. The feed amount setter 42 also calculates the feed amount [F] of the web 31 required during the job, based on the extracted reference feed amount [Fref] and the previous job information. A procedure for setting the feed amount [F] by the feed amount setter 42 will be described in detail in the following image forming method.

[Reference Feed Amount Database 43]

Figure 4:
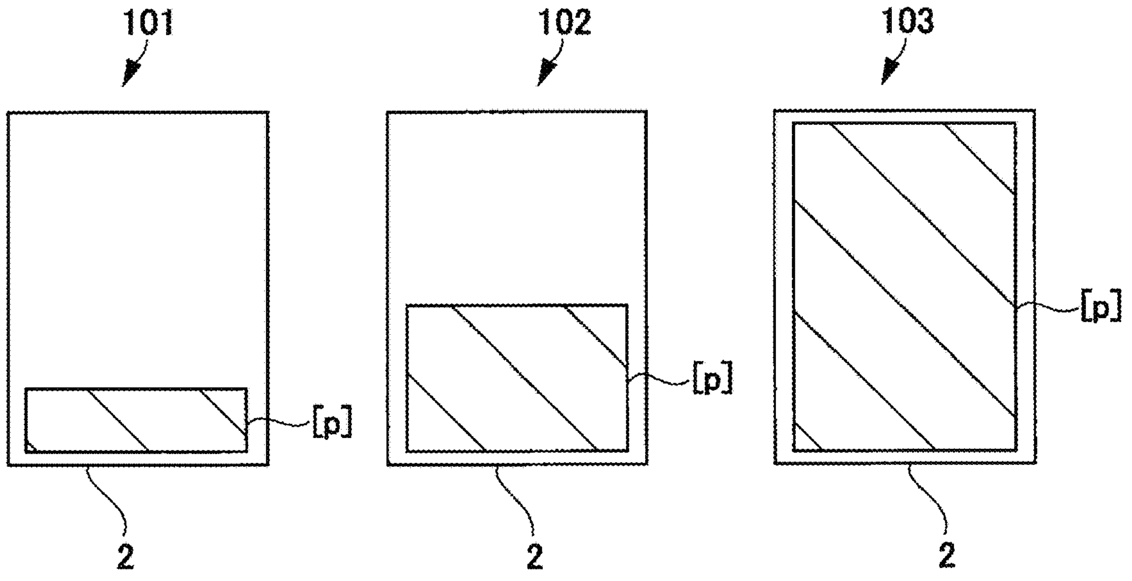
FIG. 4 is a diagram showing an image area ratio with respect to a recording medium.

The reference feed amount database 43 stores the feed amount [F] of the web 31 for each image area ratio of the toner image with respect to the recording medium 2 as a reference feed amount [Fref]. FIG. 4 is a diagram showing an image area ratio with respect to the recording medium 2. As shown in FIG. 4, a ratio of the image [p] to the recording medium 2 is defined as an image area ratio. The image area ratio corresponds to an amount of toner used on the recording medium 2 per predetermined area. Therefore, the image area ratio also corresponds to the amount of the offset toner and wax adhered to the fixing surface 11*a* of the fixing roller 11 and furthermore to the side circumferential surface of the cleaning roller 21, shown in FIGS. 1 and 2.

Although FIG. 4 shows a state in which the image [p] is formed in one area of the recording medium 2, the image [p] may be dispersed in areas on the recording medium 2. For example, as shown in FIG. 4, the reference feed amount database 43 stores a reference feed amount [Fref] for each of three levels (or each of multiple levels more than three) of a small area ratio 101 when the image area ratio is 10% or less, a medium area ratio 102 when the image area ratio is 10% to 50%, and a large area ratio 103 when the image area ratio is 50% or more.

Furthermore, the reference feed amount database 43 stores a reference feed amount [Fref] for each medium type and toner type in the above job information.

The reference feed amount [Fref] as described above is a value when the ratio of the feeding speed [v2] of the web 31 by the winding roller 33 relative to the rotation speed [v1] of the cleaning roller 21 is in a predetermined state. For example, the reference feed amount [Fref] is set as a value during image formation in which the rotation speed [v1] of the cleaning roller 21 is determined. Such a reference feed amount [Fref] is a value obtained in advance by experiment as a value with which the offset toner and the wax can be collected from the side circumferential surface of the cleaning roller 21 for each image area ratio, medium type, and toner type.

«Method of Cleaning Image Forming Apparatus»

Figure 5:
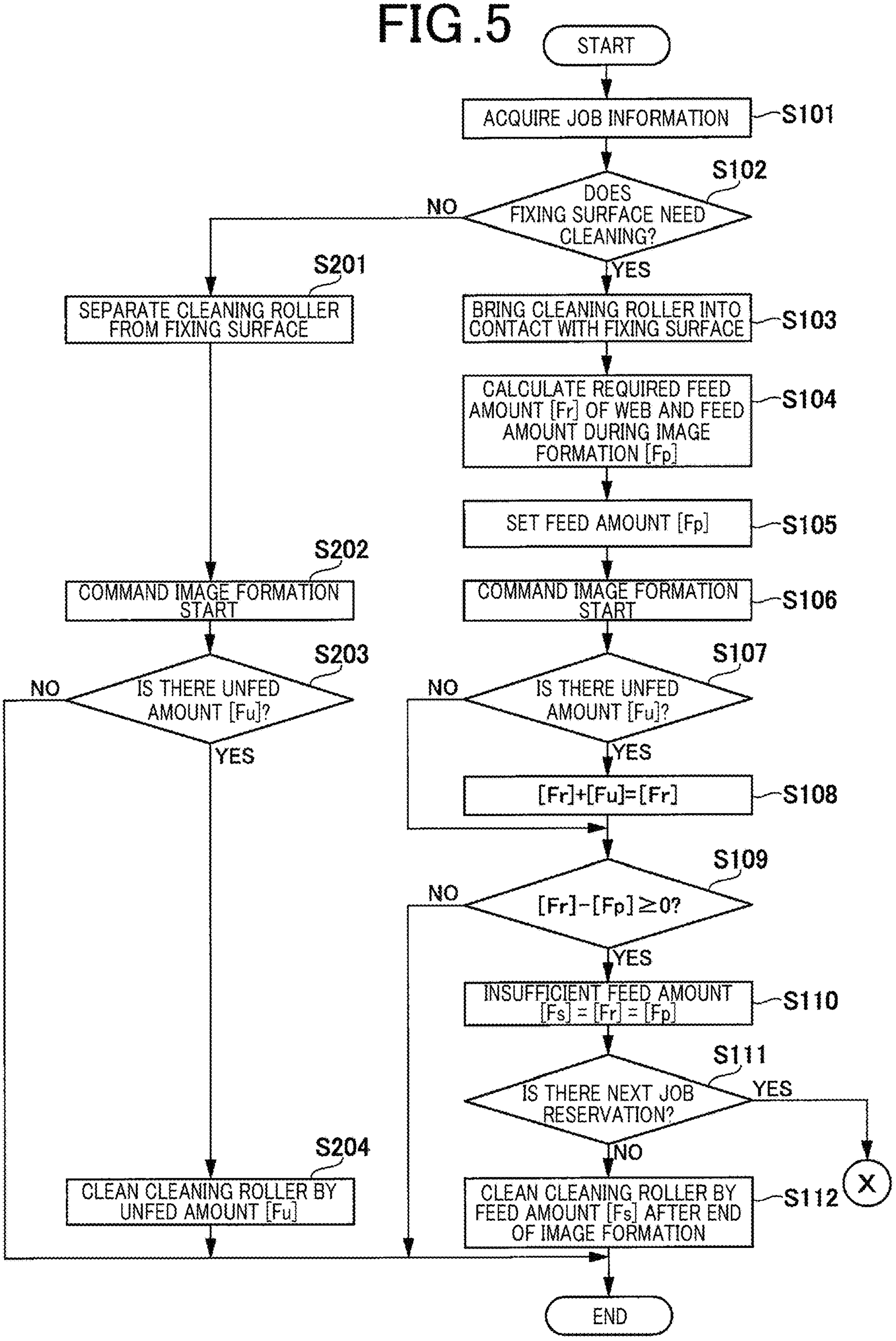
FIG. 5 is a flowchart (part 1) showing a method of cleaning the image forming apparatus according to the embodiment.
Figure 6:
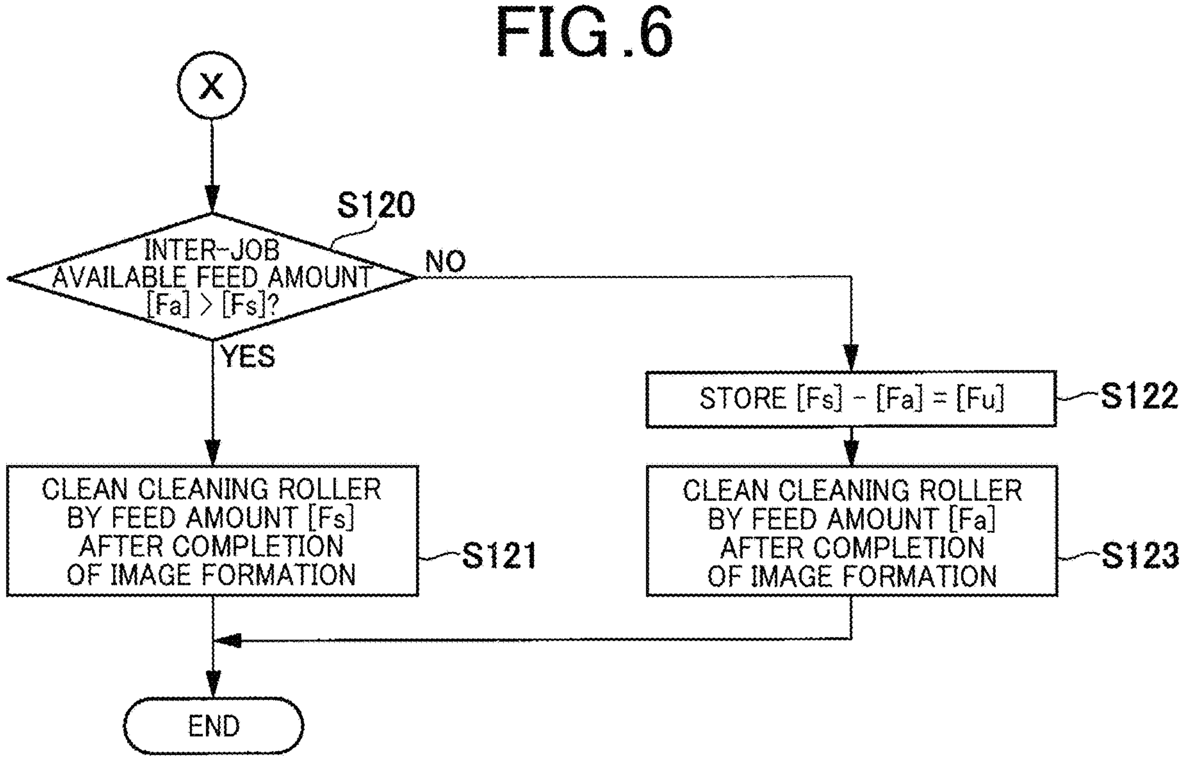
FIG. 6 is a flowchart (part 3) showing the method of cleaning the image forming apparatus according to the embodiment.

Next, a method of cleaning the image forming apparatus in the image forming apparatus 1 as described above will be described. FIGS. 5 and 6 are flowcharts (part 1) and (part 2) showing a method of cleaning the image forming apparatus according to an embodiment. These flowcharts show a procedure executed by a program in the controller 40 of the image forming apparatus 1. Hereinafter, a method of cleaning the image forming apparatus according to the embodiment will be described according to the flowcharts of FIG. 5 and FIG. 6 and with reference to previous FIG. 1 to FIG. 4 and other necessary drawings.

[Step S101]

First, in Step S101, the image formation controller 41 acquires job information regarding the current job to be executed. The job information is information input from an external device or an operation part (not illustrated) of the image forming apparatus 1, and includes an image area ratio, a medium type, a toner type, a medium size (conveyance direction), and the number of sheets on which images are formed.

[Step S102]

In Step S102, the image formation controller 41 determines whether the fixing surface 11*a* of the fixing roller 11 needs cleaning. At this time, when it is necessary to collect the offset toner and the wax depending on the media type and the toner type, the image formation controller 41 determines that cleaning is necessary (YES), and the process proceeds to Step S103. On the other hand, when it is not necessary to collect the offset toner and the wax according to the media type and the toner type, it is determined that cleaning is unnecessary (NO), and the process proceeds to Step S201. The image formation controller 41 has information on whether or not it is necessary to collect the offset toner and the wax for each medium type and toner type, and performs the determination based on this information.

[Step S103]

In Step S103, as shown in FIG. 1, the image formation controller 41 controls the driver of the cleaning roller 21 to thereby cause the side circumferential surface of the cleaning roller 21 to be in contact with the fixing surface 11*a* of the fixing roller 11.

[Step S104]

In Step S104, the feed amount setter 42 calculates the required feed amount [Fr] of the web 31 and the feed amount during image formation [Fp] based on the job information acquired by the image formation controller 41 in Step S101.

The required feed amount [Fr] is a feed amount of the web 31 required for the entire job. The feed amount during image formation [Fp] is a feed amount of the web 31 during execution of image formation. The feed amount during image formation [Fp] is a value included in the required feed amount [Fr]. These are calculated as follows.

In the calculation of the required feed amount [Fr], the feed amount setter 42 first extracts, from the reference feed amount database 43, a reference feed amount [Fref] that matches the medium type, the toner type, and the image area ratio included in the acquired job information. When the image forming apparatus 1 includes a detection device that detects the surface roughness of the recording medium 2, the surface roughness of the recording medium 2 detected by the detection device may be used as the medium type.

Next, using the extracted reference feed amount [Fref], the required feed amount [Fr] is calculated by multiplying the medium size (conveyance direction) by the number of sheets on which images are formed included in the acquired job information.

In addition, in the calculation of the feed amount during image formation [Fp], the feed amount setter 42 calculates the feed amount during image formation [Fp] from, for example, the medium size (transport walk) and the number of sheets on which images are formed in the acquired job information. At this time, the feed amount setter 42 calculates the feed amount during image formation [Fp] by multiplying the web feed amount per sheet of recording medium, which is determined in advance with respect to the medium size, by the number of sheets on which images are formed. That is, the feed amount setter 42 calculates the feed amount during image formation [Fp] regardless of the medium type, the toner type, and the image area ratio in the job information.

Figure 7:
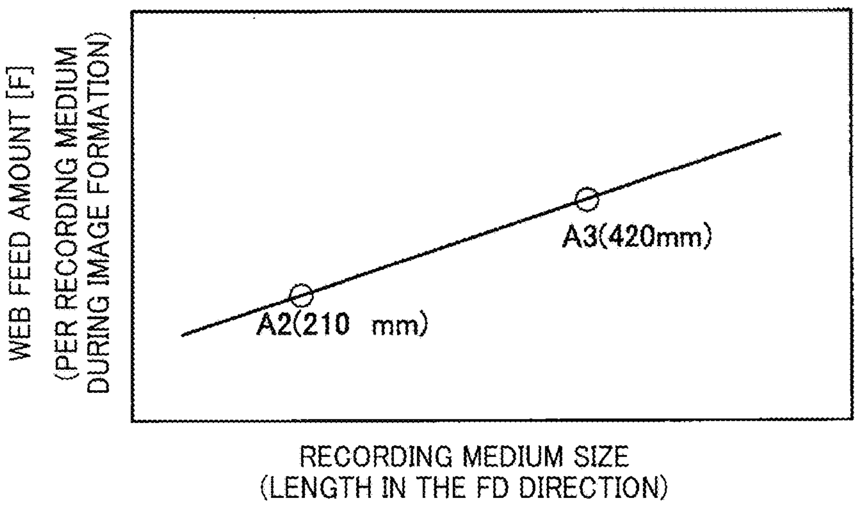
FIG. 7 is a graph showing a relation between the size of the recording medium and the web feed amount during image formation.

Here, FIG. 7 is a graph which shows the relation between the size of the recording medium and the web feed amount during image formation. The horizontal axis of FIG. 7 represents the medium size (length in the conveyance direction), and the vertical axis represents the web feed amount [F] during image formation per sheet of recording medium. The feed amount setter 42 retains the relationship shown in this graph in advance. The feed amount setter 42 calculates, as the web feed amount during image formation [Fp], a value obtained by multiplying the web feed amount [F] during image formation per sheet of recording medium extracted based on the medium size (length in the conveyance direction) acquired as the job information by the number of sheets on which images are formed acquired as the job information.

Figure 8:
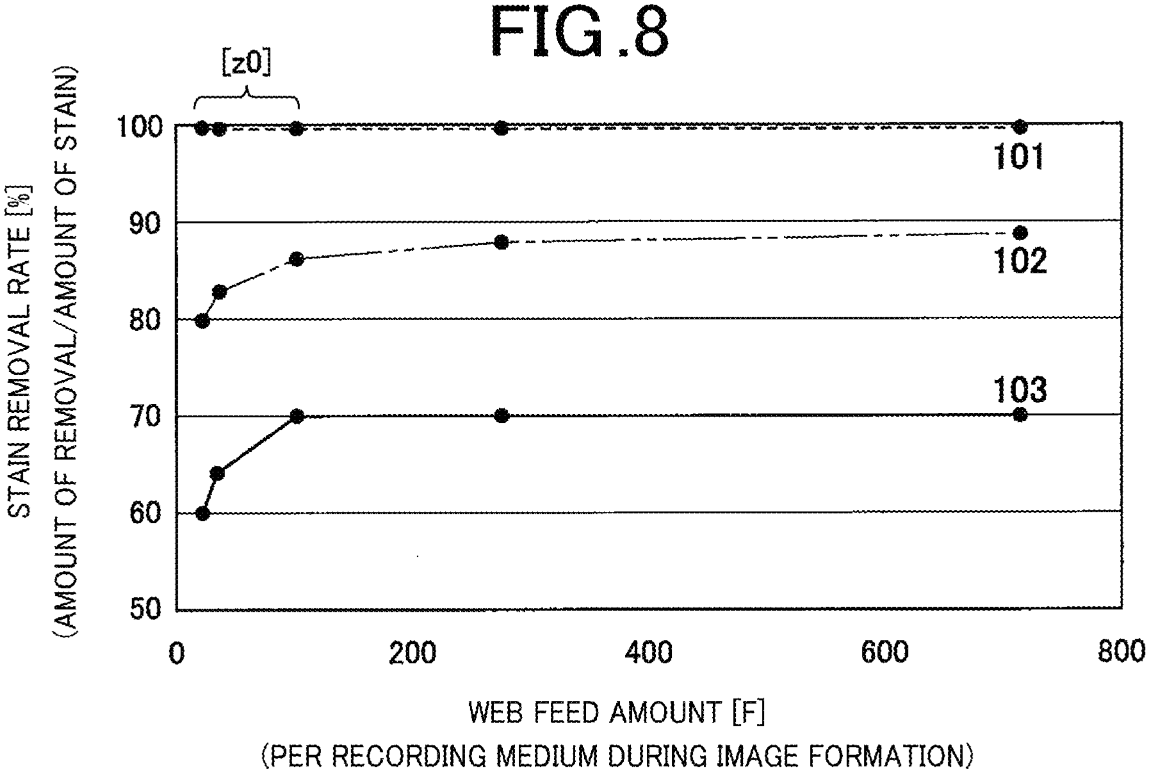
FIG. 8 is a graph showing relationships between the web feed amount and the stain removal rate for each image area ratio.

FIG. 8 is a graph showing the relationships between the web feed amount and the stain removal rate for each image area ratio. As an example, the image area ratio has three levels of the small area ratio 101, the medium area ratio 102, and the large area ratio 103 (see FIG. 4). The horizontal axis of FIG. 8 indicates the feed amount [F] of the web per sheet of recording medium during image formation. The medium size (length in the conveyance direction) of the recording medium is an arbitrary size. The vertical axis of FIG. 8 represents the stain removal rate from the side circumferential surface of the cleaning roller 21, that is, the collection rate of the offset toner and wax. As shown in the graph of FIG. 8, at any image area ratio, when the web feed amount [F] increases to a certain extent, the increase in the stain removal rate reaches a plateau. For this reason, it is assumed that the "web feed amount per recording medium" for calculating the feed amount during image formation [Fp] is set within the range [z0] in which the stain removal rate is expected to increase, regardless of the image area ratio.

[Step S105]

Next, in Step S105, the image formation controller 41 sets the feed amount during image formation [Fp] calculated by the feed amount setter 42 in Step S104. At this time, the image formation controller 41 sets the feeding speed [v2] of the web 31 by the winding of the winding roller 33, based on the predetermined rotation speed [v0] of the fixing roller 11 and the predetermined rotation speed [v1] of the cleaning roller 21 during the image formation. As a result, the movement distance of the web 31 during execution of the image formation for the set number of sheets on which images are formed, i.e., the feed amount during image formation [Fp] is set.

[Step S106]

In Step S106, the image formation controller 41 commands each unit of the image forming apparatus 1 to start the image formation of the job. The units of the image forming apparatus 1, including the fixing roller 11 and the cleaning roller 21, thereby start image formation on the recording medium 2 according to the job information. Further, the winding roller 33 starts to wind the web 31 so as to achieve the feed amount during image formation [Fp] set in Step S105.

[Step S107]

In Step S107, the feed amount setter 42 determines whether or not there is an unfed amount [Fu]. The unfed amount [Fu] is a feed amount of the web 31 that could not be used in the previous job that was implemented immediately before the current job. When there is left an unfed amount [Fu] in the previous job, the feed amount setter 42 stores it. In a case where the feed amount setter 42 stores the unfed amount [Fu], it is determined that there is an unfed amount [Fu] (YES) and the process proceeds to Step S108. On the other hand, in a case where the feed amount setter 42 does not have the unfed amount [Fu] stored, it is determined that there is no unfed amount [Fu] (NO), and the process proceeds to Step S109.

[Step S108]

In Step S108, the feed amount setter 42 adds the unfed amount [Fu] to the required feed amount [Fr] of the web calculated in Step S104 to newly obtain the required feed amount [Fr], and the process proceeds to Step S109.

[Step S109]

In Step S109, the feed amount setter 42 determines whether or not a value obtained by subtracting the feed amount during image formation [Fp] calculated in Step S104 from the required feed amount [Fr] is equal to or greater than zero. If it is determined that it is equal to or greater than zero (YES), the process proceeds to Step S110.

On the other hand, if it is determined that it is not equal to or greater than zero (NO), the process is ended. In this case, since the required feed amount [Fr] is equal to or less than the feed amount during image formation [Fp] and the feed of the web 31 by the required feed amount [Fr] is completed during the image formation of the current job, the process may be ended. Note that the end of the process here is the end of the cleaning of the cleaning roller 21 during the job. The end of the job is after the image formation of the number of sheets on which images are formed acquired in Step S101 is completed.

[Step S110]

In Step S110, the feed amount setter 42 calculates, as an insufficient feeding amount [Fs], a value obtained by subtracting the feeding amount during image formation [Fp] calculated in step S104 from the required feeding amount [Fr].

[Step S111]

In Step S111, the feed amount setter 42 determines, based on the information from the image formation controller 41, whether there is a reservation for the next job following the current job currently being performed. If it is determined that there is a reservation for the next job (YES), the process proceeds to Step S120. On the other hand, if it is determined that there is no reservation for the next job (NO), the process proceeds to Step S112.

[Step S112]

In Step S112, after the completion of the image formation of the current job currently being performed, the image formation controller 41 feeds the web 31 by the insufficient feed amount [Fs] to clean the side circumferential surface of the cleaning roller 21.

At this time, as shown in FIG. 2, the image formation controller 41 separates the side circumferential surface of the cleaning roller 21 from the fixing surface 11*a* of the fixing roller 11 at the time when the image formation of the job is completed. The image formation controller 41 cleans the side circumferential surface of the cleaning roller 21 in a state where the side circumferential surface of the cleaning roller 21 is separated from the fixing surface 11*a* of the fixing roller 11. When the cleaning ends, the entire processing of the job ends.

[Step S120]

Step S120 is a step to which the process proceeds when it is determined in Step S111 that there is a reservation for the next job (YES). In this Step S120, the feed amount setter 42 determines whether or not the inter-job allowable feed amount [Fa] is greater than the insufficient feed amount [Fs]. Here, the term "inter-job" refers to a job end period required from the end of image formation in the current job currently being executed to the start of the next job, and is included in the period of the current job. The inter-job allowable feed amount [Fa] is an amount of the web 31 that can be fed in the job end period, and depends on the feeding speed [v2] of the web 31. The feed amount setter 42 proceeds to Step S121 if it is determined that the inter-job allowable feed amount [Fa] is greater than the insufficient feed amount [Fs] (YES), and the process proceeds to Step S122 if it is determined that it is not (NO).

[Step S121]

In Step S121, after the completion of the image formation of the current job currently being performed, the image formation controller 41 feeds the web 31 by the insufficient feed amount [Fs] to clean the side circumferential surface of the cleaning roller 21. This Step S121 is the same step as the previous Step S112, and the entire processing of the job ends after the end of cleaning.

[Step S122]

On the other hand, in Step S122, the feed amount setter 42 stores the value obtained by subtracting the inter-job allowable feed amount [Fa] from the insufficient feed amount [Fs] as the unfed amount [Fu].

Figure 9:
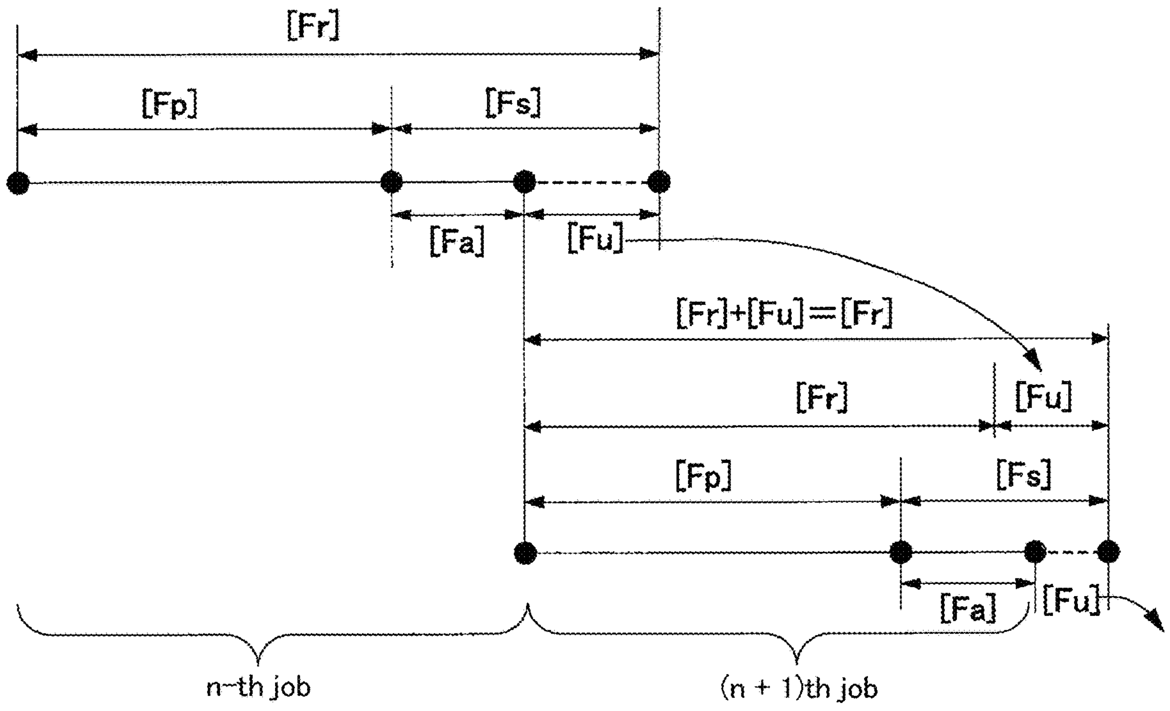
FIG. 9 is a diagram (part 1) for explaining the method of cleaning the image forming apparatus according to the embodiment.
Figure 10:
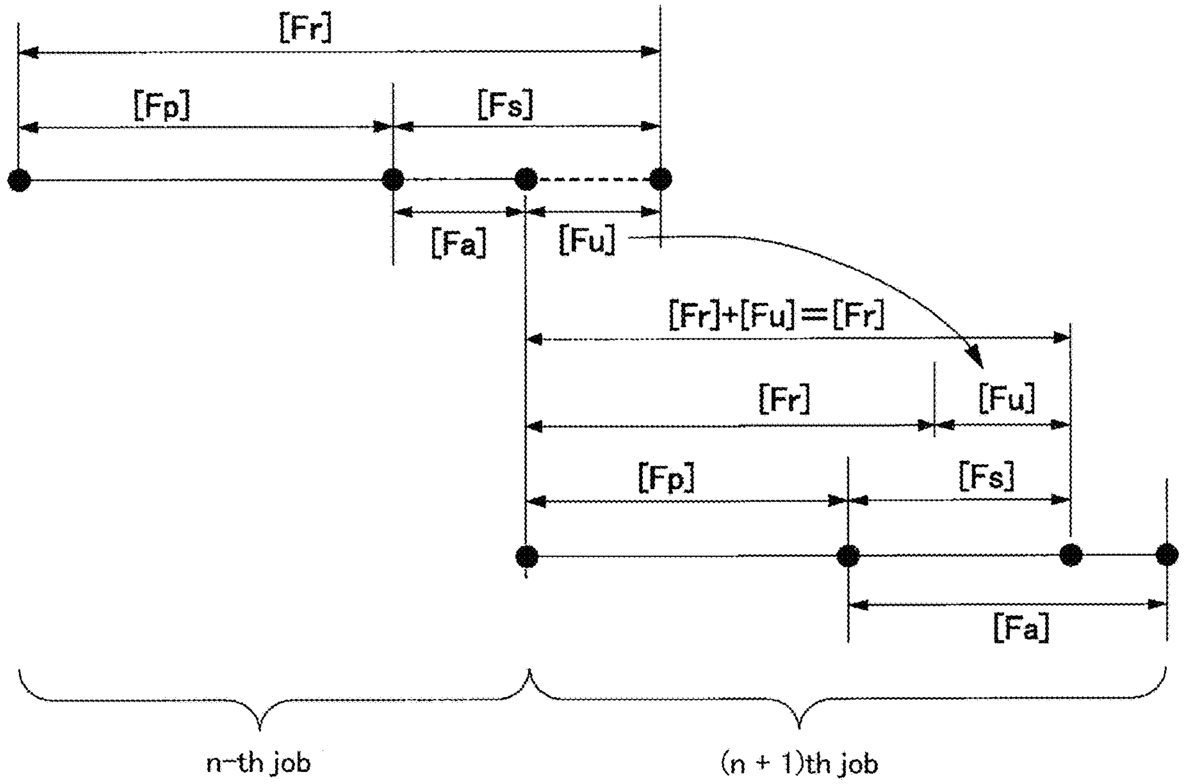
FIG. 10 is a diagram (part 2) for explaining the method of cleaning the image forming apparatus according to the embodiment.

Here, FIGS. 9 and 10 are diagrams (part 1) and (part 2) for explaining the method of cleaning the image forming apparatus according to the embodiment. As shown in these drawings, assuming that the job currently being performed is an n-th job, a feed amount obtained by subtracting the feed amount during image formation [Fp] from the required feed amount [Fr] of the web 31 during a period of the n-th job is the insufficient feed amount [Fs]. Then, a feed amount obtained by subtracting, from the insufficient feed amount [Fs], the inter-job allowable feed amount [Fa] that can be executed in the job end period until the next (n+1)th job is started after the execution of the feed amount during image formation [Fp] in the nth job is the unfed amount [Fu]. The unfed amount [Fu] calculated here becomes the unfed amount [Fu] of Steps S107, S108, and S203 in the (n+1)th job to be subsequently executed.

Therefore, for example, in Step S108 of the processing of the next (n+1)th job, the unfed amount [Fu] left in the n-th job is added to the required feed amount [Fr] of the web 31 calculated in Step S104 to obtain a new required feed amount [Fr]. Therefore, the unfed amount [Fu] left in the n-th job currently being executed is executed in the next (n+1)th job.

Note that in the case where the inter-job allowable feed amount [Fa] is greater than the insufficient feed amount [Fs] (in the case of proceeding to NO in Step S120), no unfed amount [Fu] is newly left, like in the (n+1)th job in FIG. 10.

[Step S123]

In Step S123, after the completion of the image formation of the job currently being performed, the image formation controller 41 feeds the web 31 by the inter-job allowable feed amount [Fa] to clean the side circumferential surface of the cleaning roller 21. This Step S123 is a step different from the preceding Step S112 only in the feed amount of the web 31, and the entire processing of the job ends at the point in time when the cleaning ends.

[Step S201]

Step S201 is a step to which the process proceeds when it is determined in the previous Step S102 that the cleaning of the fixing surface 11*a* is not necessary (NO). In this Step S201, as shown in FIG. 2, the image formation controller 41 separates the cleaning roller 21 from the fixing surface 11*a*.

[Step S202]

In Step S202, the image formation controller 41 commands each unit of the image forming apparatus 1 to start the image formation of the job. The units of the image forming apparatus 1, including the fixing roller 11 and the cleaning roller 21, thereby start image formation on the recording medium 2 according to the job information.

[Step S203]

In Step S203, the feed amount setter 42 determines whether or not there is an unfed amount [Fu]. This determination is made in the same procedure as in Step S107, and when it is determined that there is an unfed amount [Fu] (YES), the process proceeds to Step S204. On the other hand, when it is determined that there is no unfed amount [Fu] (NO), the process is ended. Note that the end of the process here is the end of the cleaning of the cleaning roller 21 during the job. The end of the job is after the image formation of the number of sheets on which images are formed acquired in Step S101 is completed.

[Step S204]

In Step S204, the image formation controller 41 performs cleaning of the side circumferential surface of the cleaning roller 21 by the unfed amount [Fu], and then ends the process. Note that the end of the process here is the end of the cleaning of the cleaning roller 21 during the job. The end of the job is after the image formation of the number of sheets on which images are formed acquired in Step S101 is completed.

Effects of Embodiment

According to the embodiment described above, the required feed amount [Fr] of the web 31 is calculated on the basis of the image area ratio in the job, and in the case where the web 31 cannot be fed by the required feed amount [Fr] during the image formation, the web 31 is fed by the insufficient feed amount [Fs] after the completion of the image formation. Thus, regardless of the image forming mode, the offset toner and wax on the side circumferential surface of the cleaning roller 21 can be sufficiently collected by the web 31.

In addition, in a case where the unfed amount [Fu] is left before the next job is started after the image formation is completed, the unfed amount [Fu] is added to the required feed amount [Fr] in the next job. Therefore, it is possible to prevent the uncollected offset toner and wax from accumulating on the side circumferential surface of the cleaning roller 21.

As a result of the above, it is possible to prevent the offset toner and the wax from re-adhering to the fixing surface 11*a* from the cleaning roller 21, and it is possible to perform image formation without failure.

Modification Example 1

Figures 11, 12:
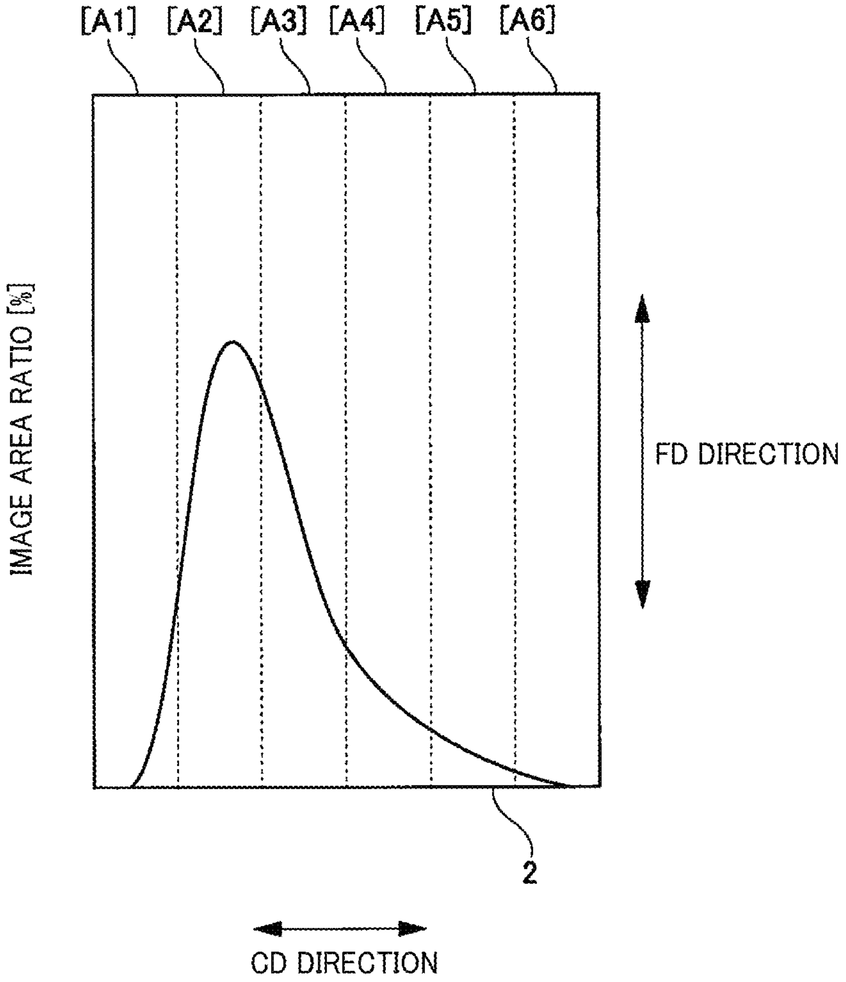
FIG. 11 is a diagram showing acquisition of an image area ratio according to Modification Example 1 of the embodiment.
FIG. 12 is a diagram showing setting of a rotation speed of a cleaning roller according to Modification Example 2 of the embodiment.

As Modification Example 1 of the above-described embodiment, another example of the image area ratio acquired by the feed amount setter 42 in Step S101 will be described. FIG. 11 is a diagram showing acquisition of an image area ratio according to Modification Example 1 of the embodiment. As shown in FIG. 11, the feed amount setter 42 acquires, as one piece of job information, the image areal ratio of each of the areas [A1] to [A6] obtained by dividing the recording medium 2 in the conveyance widthwise direction [CD]. The number of divisions of the recording medium 2 in the conveyance widthwise direction [CD] is not limited to six divisions of the areas [A1] to [A6], and may be a number of divisions corresponding to the characteristics of the image formed on the recording medium 2.

In this case, when the required feed amount [Fr] of the web is calculated in Step S104, the reference feed amount [Fref] associated with the highest value of the image area ratio among the image area ratios of the respective areas [A1] to [A6] is extracted from the reference feed amount database 43.

According to such Modification Example 1, even in a case where the difference in image area ratio in the conveyance width direction [CD] is large, it is possible to clean the side circumferential surface of the cleaning roller 21 without causing partial collection remainder of the offset toner and the wax in the conveyance width direction [CD].

Modification Example 2

As Modification Example 2 of the above-described embodiment, a configuration in which the rotation speed [v1] of the cleaning roller 21 is changed in cleaning of the side circumferential surface of the cleaning roller will be described. This configuration applies to Steps S112, S121, S123, and S204. That is, as shown in FIG. 2, this configuration is applied to a case where the side circumferential surface of the cleaning roller 21 is cleaned in a state where the cleaning roller 21 is separated from the fixing surface 11*a*.

In this case, the rotation speed [v1] of the cleaning roller 21 is not influenced by the rotation speed of the fixing roller 11. Therefore, the rotation speed [v1] of the cleaning roller 21 can be set to a value in consideration of the cleaning capability of the side circumferential surface of the cleaning roller 21.

Therefore, the feed amount setter 42 of the controller 40 changes the rotation speed of the cleaning roller 21 when the insufficient feed amount [Fs] of the web fed to the cleaning roller 21 after the end of the image formation is larger than a predetermined feed amount. This is applied to a case where the amount of the offset toner and wax adhering to the side circumferential surface of the cleaning roller 21 is expected to be larger than a predetermined amount based on the job information.

Here, as the rotation speed [v1] of the cleaning roller 21 becomes slower, the contact time of the side circumferential surface of the cleaning roller 21 with the web 31 becomes longer. Therefore, the collection rate of the offset toner and the wax by the web 31 may be improved. Therefore, as shown in FIG. 2, in a case where the side circumferential surface of the cleaning roller 21 is cleaned in a state where the cleaning roller 21 is separated from the fixing surface 11*a*, the rotation speed [v1] of the cleaning roller 21 is set to be lower than that during the image formation.

FIG. 12 is a diagram showing setting of a rotation speed of the cleaning roller according to Modification Example 2 of the embodiment. In this case, the controller 40 (see FIGS. 1 to 3) includes, as a database related to the rotation speed of the cleaning roller, a database in which the image area ratio and the number of sheets on which images are formed as shown in FIG. 12 are associated with the rotation speed of the cleaning roller. In this database, the rotation speed of the cleaning roller 21 is set to be lower as the number of sheets on which images are formed is larger and as the image area ratio is larger. In other words, the rotation speed of the cleaning roller 21 is set to be lower as the amount of the toner adhering to the side circumferential surface of the cleaning roller 21 in a job is larger.

Further, the image formation controller 41 extracts the rotation speed of the cleaning roller 21 from the database based on the image area ratio and the number of sheets on which images are formed in the job information. Next, in a case of cleaning the side circumferential surface of the cleaning roller 21 in the state shown in FIG. 2, as in Steps S112, S204, and the like, the rotation speed of the cleaning roller 21 is adjusted to the extracted rotation speed. In FIG. 12, the rotation speed of the cleaning roller 21 is shown as a low speed, a medium speed, and a high speed, but these speeds are assumed to be set to appropriate values by experiments in advance.

Furthermore, as described above, when the rotation speed [v1] of the cleaning roller 21 is changed to a lower speed than that during image formation after the completion of the image formation, the feeding speed [v2] of the web 31 is also changed. Here, as described with reference to FIG. 8 in the previous embodiment, the rate of stain removal from the side circumferential surface of the cleaning roller 21 by the web 31 reaches a plateau when the web feed amount [F] increases to a certain extent. Therefore, with the decrease in the rotation speed [v1] of the cleaning roller 21, the feed speed [v3] of the web 31 is also decreased to be within the range [z0] in which the stain removal rate is expected to increase.

According to such Modification Example 2, by adjusting the rotation speed [v1] of the cleaning roller 21 after the completion of the image formation, it is possible to improve the collection rate of the offset toner and wax from the side circumferential surface of the cleaning roller 21 by the web 31. Furthermore, the feed amount of the web 31 can also be reduced by reducing the feed speed of the web 31.

In the description of Modification Example 2, the collection rate of the offset toner and wax is improved as the contact time of the web 31 with the side circumferential surface of the cleaning roller 21 is longer. However, even if the contact time decreases, the collection rate increases as the speed difference between the rotation speed [V1] of the cleaning roller 21 and the feeding speed [V2] of the web increases, depending on the medium type of the recording media 2 and the toner type. In this case, as shown in FIG. 2, when the side circumferential surface of the cleaning roller 21 is cleaned in a state where the cleaning roller 21 is separated from the fixing surface 11*a*, the rotation speed [v1] of the cleaning roller 21 may be set to be higher than that during the image formation. Further, in this case, the feeding speed [v2] of the web 31 is also increased so as to be within a range [z0] in which an increase in the stain removal rate is expected.

Furthermore, as described above, when the rotation speed [v1] of the cleaning roller 21 and the feeding speed [v2] of the web 31 are changed between during image formation and after the completion of the image formation, the insufficient feed amount [Fs] after the completion of the image formation is also changed. In this case, the feed amount setter 42 (FIG. 3) may correct the insufficient feed amount [Fs] in accordance with the change in the speed in Step S110 shown in FIG. 5.

Modification Example 3

Figure 13:
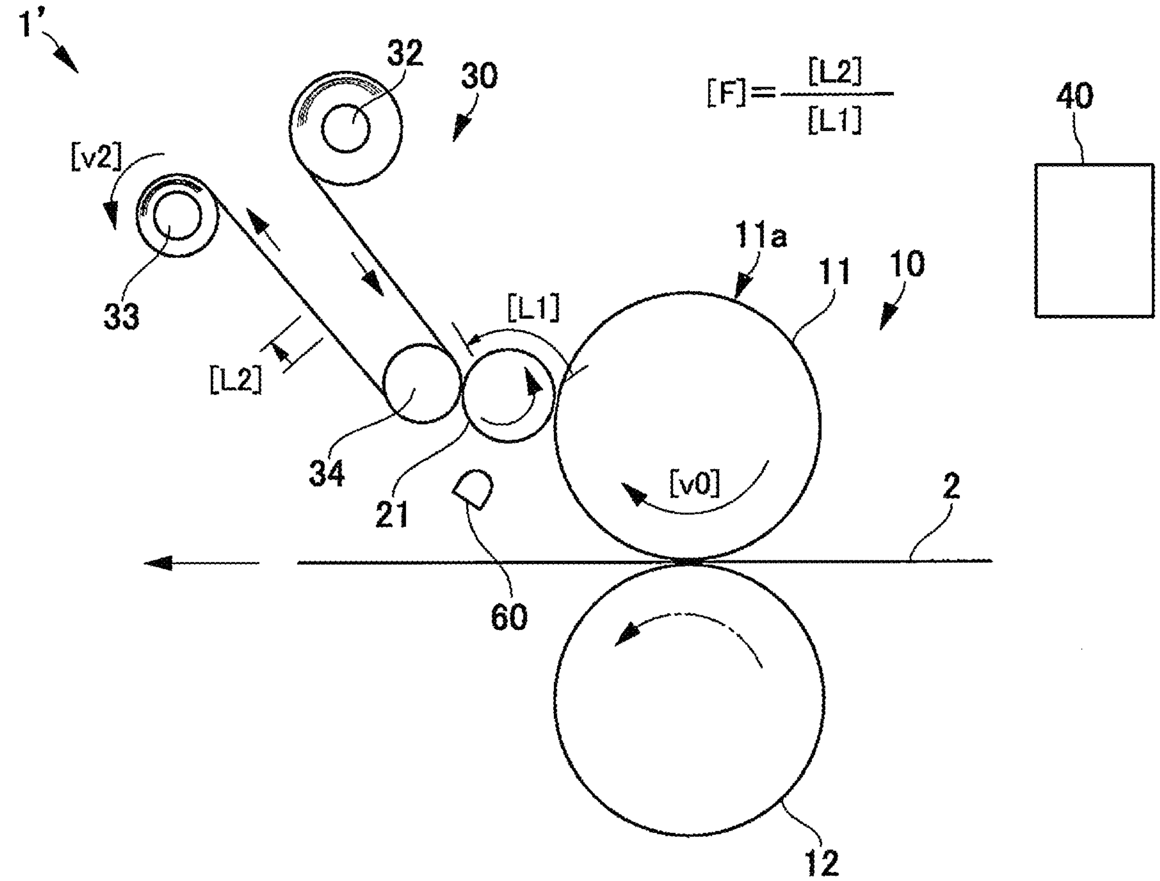
FIG. 13 is a configuration diagram showing a main part of an image forming apparatus in Modification Example 3 of the embodiment.

FIG. 13 is a configuration diagram showing a main part of the image forming apparatus 1' according to Modification Example 3 of the embodiment. The image forming apparatus 1' shown in FIG. 13 is different from the image forming apparatus 1 shown in FIGS. 1 and 2 in that a detection device 60 for detecting the amount of the offset toner and wax adhering to the side circumferential surface of the cleaning roller 21 is provided.

The detection device 60 is, for example, a reflective optical sensor, and measures the adhesion state of the offset toner and wax to the side circumferential surface of the cleaning roller 21 at a predetermined interval, and sends the measurement result to the controller 40. The image formation controller 41 controls the rotation speed of the cleaning roller 21 based on the measurement result of the detection device 60. Such control is applied to Steps S112, S121, S123, and S204. That is, as shown in FIG. 2, the present invention is applied to a case where the side circumferential surface of the cleaning roller 21 is cleaned in a state where the cleaning roller 21 is separated from the fixing surface 11*a*.

In this case, the controller 40 includes a determination unit that determines the adhesion amount of the offset toner and wax to the side circumferential surface of the cleaning roller 21 based on the measurement result in the detection device 60.

When the determination unit determines that the adhesion amount is larger than the predetermined amount, the image formation controller 41 controls the rotation speed [v1] of the cleaning roller 21 to be lower than that during image formation to clean the side circumferential surface of the cleaning roller 21, as in the procedure described in Modification Example 2. In this case, similarly to the procedure described in Modification Example 2, the feeding speed [V2] of the web 31 is also changed. This improves the collection rate of the offset toner and wax.

On the other hand, when the determination unit determines that the adhesion amount is smaller than the predetermined amount, the image formation controller 41 may increase the rotation speed [v1] of the cleaning roller 21 after the completion of the image formation relative to that during the image formation. This shortens the time required for cleaning the side circumferential surface of the cleaning roller 21.

The determination value of the adhesion amount and the adjustment amount of the rotation speed [v1] of the cleaning roller 21 may be stepwise.

According to such Modification Example 3, the rotation speed [v1] of the cleaning roller 21 can be adjusted in accordance with the degree of adhesion of the offset toner and wax to the side circumferential surface. As a result, it is possible to improve the collection rate of the offset toner and wax and to shorten the cleaning time of the side circumferential surface of the cleaning roller 21.

Also in Modification Example 3, similarly to Modification Example 2, the increase of the rotation speed [v1] of the cleaning roller 21 may improve the collection rate of the offset toner and wax depending on the medium type of the recording media 2 and the toner type.

Furthermore, similarly to Modification Example 2, when the rotation speed [v1] of the cleaning roller 21 and the feeding speed [v2] of the web 31 are changed between during image formation and after the completion of image formation, the insufficient feed amount [Fs] after the completion of image formation is also changed. In this case, the feed amount setter 42 (FIG. 3) may correct the insufficient feed amount [Fs] in accordance with the change in the speed in Step S110 shown in FIG. 5.

Modification Example 4

As Modification Example 4 of the embodiment, a configuration in which the image forming operation is interrupted during the image formation of the job and the cleaning of the side circumferential surface of the cleaning roller 21 is performed will be exemplified. In this case, the controller 40 includes a determination unit that determines the adhesion amount of the offset toner and wax to the side circumferential surface of the cleaning roller 21 based on the measurement result in the detection device 60 described in Modification Example 3, for example. The determination of the adhesion amounts of the offset toner and the wax by the determination unit may be determination based on the job information.

In the case where the determination unit determines that the amount of adhesion is greater than the predetermined amount, the image formation controller 41 interrupts the image forming operation during the image formation of the job. Then, as shown in FIG. 2, the cleaning roller 21 is separated from the fixing surface 11*a*, and the side circumferential surface of the cleaning roller 21 is cleaned. In this case, the rotation speed [v1] of the cleaning roller 21 may be made lower than that during the image formation. In this case, the feed amount of the web 31 in the cleaning performed with the image forming operation interrupted is to be included in the feed amount during image formation [Fp]. Then, Step 107 and the subsequent steps shown in FIGS. 5 and 6 may be performed in the same procedure as that described in the embodiment.

According to such Modification Example 4, in a case where a large amount of offset toner and wax is adhered to the side circumferential surface of the cleaning roller 21 in continuous image formation on a plurality of recording media 2, the image formation can be interrupted to collect them. Therefore, even when the amounts of the offset toner and the wax adhering to the cleaning roller 21 are large in the image formation on the plurality of recording media 2, the image formation without failure is possible.

Although embodiments of the present invention have been described and shown in detail, the disclosed embodiments are made for purposes of illustration and example only and not limitation. The scope of the present invention should be interpreted by terms of the appended claims.

What is claimed is:

1. An image forming apparatus comprising:

a cleaning roller that collects an adhering substance adhering to a fixer for fixing a toner image onto a recording medium;

a web feeder that feeds, to the cleaning roller, a web for collecting the adhering substance adhering to the cleaning roller; and a hardware processor that controls operation of the web feeder, wherein the hardware processor:

calculates, based on job information of image formation, a required feed amount of the web required for collecting the adhering substance adhering to the cleaning roller; and, when the required feed amount is greater than a feed amount of the web that can be fed during execution of image formation of a job related to the job information, feeds the web to the cleaning roller after completion of the image formation.

2. The image forming apparatus according to claim 1, wherein the hardware processor:

when there is left an unfed amount of the web that is not fed of the required feed amount during a period until a start of image formation of a next job reserved subsequent to the job, feeds the web to the cleaning roller by the unfed amount at a timing different from a timing of the job.

3. The image forming apparatus according to claim 2, wherein the different timing is during the next job reserved subsequent to the job.

4. The image forming apparatus according to claim 1, wherein a feeding speed of the web relative to the cleaning roller is set during the execution of the image formation and after the completion of the image formation in the web feeder.

5. The image forming apparatus according to claim 1, wherein the job information includes an image area ratio of the toner image with respect to the recording medium, a medium type of the recording medium, a toner type constituting the toner image, a medium size of the recording medium, and the number of sheets on which images are formed.

6. The image forming apparatus according to claim 5, wherein the fixer includes a fixing roller for heating the recording medium and conveys the recording medium in a direction of rotation of the fixing roller, wherein the hardware processor calculates the required feed amount of the web based on an image area ratio of each of divided areas obtained by dividing the recording medium in a conveyance widthwise direction orthogonal to a conveyance direction of the recording medium by the fixer.

7. The image forming apparatus according to claim 5, further comprising:

a detection device that detects surface roughness of the recording medium, wherein the hardware processor determines the medium type in the job information based on the surface roughness detected by the detection device.

8. The image forming apparatus according to claim 1, wherein the cleaning roller:

rotates at a predetermined rotation speed while being in contact with the fixer during the execution of the image formation; and changes the rotation speed in a state of being separated from the fixer after the completion of the image formation.

9. The image forming apparatus according to claim 8, wherein the web feeder changes a feeding speed of the web relative to the cleaning roller in accordance with a change in the rotation speed of the cleaning roller.

10. The image forming apparatus according to claim 9, wherein the hardware processor, when a feed amount of the web to be fed to the cleaning roller after the completion of the image formation is greater than a predetermined feed amount, causes the cleaning roller to change the rotation speed.

11. The image forming apparatus according to claim 9, wherein the rotation speed of the cleaning roller is changed based on an adhesion amount of the adhering substance to the cleaning roller.

12. The image forming apparatus according to claim 9, further comprising:

a detection device that detects an amount of the adhering substance adhering to the cleaning roller;

wherein the hardware processor changes the rotation speed of the cleaning roller when the amount of adhering substance detected by the detection device is greater than a predetermined feed amount.

13. The image forming apparatus according to claim 1, wherein the hardware processor, when determining that an adhesion amount of the adhering substance to the cleaning roller is larger than a predetermined amount based on the job information, suspends the image formation of the job and feeds the web to the cleaning roller in a state in which the cleaning roller is separated from the fixer.

14. A method of cleaning an image forming apparatus, the image forming apparatus comprising:

a cleaning roller that collects an adhering substance adhering to a fixer for fixing a toner image onto a recording medium; and a web feeder that feeds, to the cleaning roller, a web for collecting the adhering substance adhering to the cleaning roller, wherein a hardware processor that controls operation of the web feeder calculates, based on job information of image formation, a required feed amount of the web required for collecting the adhering substance adhering to the cleaning roller, and when the required feed amount is greater than a feed amount of the web that can be fed during execution of image formation of a job related to the job information, feeds the web to the cleaning roller after completion of the image formation.

* * * * *